(12) United States Patent
Yuan et al.

(10) Patent No.: US 8,825,813 B2
(45) Date of Patent: Sep. 2, 2014

(54) DISTRIBUTED NETWORK COORDINATE SYSTEM BASED ON NETWORK PERFORMANCE

(75) Inventors: Lihua Yuan, Redmond, WA (US); Sharad Agarwal, Seattle, WA (US); Kevin Damour, Redmond, WA (US); Thekkthalackal Varugis Kurien, Sammamish, WA (US); Albert G. Greenberg, Seattle, WA (US); Randall Kern, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 646 days.

(21) Appl. No.: 12/979,381

(22) Filed: Dec. 28, 2010

(65) Prior Publication Data

US 2012/0166598 A1 Jun. 28, 2012

(51) Int. Cl.
*G06F 13/00* (2006.01)
*H04L 29/06* (2006.01)

(52) U.S. Cl.
CPC ...................................... *H04L 29/06* (2013.01)
USPC ........................................................ 709/220

(58) Field of Classification Search
CPC ..................... H04L 29/08981; H04L 41/0806; H04L 41/12
USPC ......................................................... 709/220
See application file for complete search history.

(56) References Cited

U.S. PATENT DOCUMENTS

| | | | |
|---|---|---|---|
| 2007/0239852 A1 * | 10/2007 | Kotzin | 709/218 |
| 2008/0183891 A1 | 7/2008 | Ni et al. | |
| 2009/0070024 A1 | 3/2009 | Burchard et al. | |
| 2009/0172704 A1 | 7/2009 | Ingle et al. | |
| 2009/0303880 A1 | 12/2009 | Maltz et al. | |
| 2010/0003961 A1 | 1/2010 | Ray et al. | |
| 2010/0220697 A1 | 9/2010 | Liu et al. | |

FOREIGN PATENT DOCUMENTS

| | | |
|---|---|---|
| CN | 101123536 A | 2/2008 |
| EP | 2259087 A1 | 12/2010 |

OTHER PUBLICATIONS

Xing, et al., "Research on Optimizing Embedding Space Dimension in Network Coordinate System", Retrieved at <<http://ieeexplore.ieee.org//xpls/abs_all.jsp?arnumber=5223063>>, Proceedings of the 2009 Eigth IEEE/ACIS International Conference on Computer and Information Science, Jun. 1-3, 2009, pp. 240-245.

(Continued)

*Primary Examiner* — Robert B Harrell
(74) *Attorney, Agent, or Firm* — Ben Taybor; Kate Drakos; Micky Minhas

(57) ABSTRACT

This document relates to a distributed network coordinate system. One implementation provides computer-readable storage media including instructions that may cause a processor to perform certain acts. For example, the acts may include storing an initial network location of a first device in a network. The network may include the first device and a second device. The acts may also include monitoring one or more network performance metrics related to existing application communications with the second device, and determining an updated network location of the first device, based on the initial network location and the network performance metrics. Aspects of network health can be derived from monitoring changes in the network locations of various devices within the coordinate system.

20 Claims, 10 Drawing Sheets

(56) References Cited

OTHER PUBLICATIONS

Artigas, Marc Sanchez, "A Hierarchical Framework for Peer-to-Peer Systems: Design and Optimizations", Retrieved at <<http://www.tesisenxarxa.net/TESIS_UPF/AVAILABLE/TDX-0227109-144129//tmsa.pdf.pdf>>, Oct. 2008, pp. 144.

Doval, et al., "Overlay Networks", Retrieved at <<http://www.dynamicobjects.com/papers/w4spot.pdf>>,, the IEEE Computer Society, Aug. 2003, pp. 4.

Priyantha, et al., "AnchorFree Distributed Localization in Sensor Networks", Retrieved at <<http://citeseerx.ist.psu.edu/viewdoc/download?doi=10.1.1.5.5104&rep=rep1&type=pdf>>, Apr. 15, 2003, pp. 1-13.

CN 201110446932.5 Filed Dec. 28, 2011; Office Action and Search Report Dated Feb. 11, 2014, 12 pages.

CN 201110446932.5 Response to Office Action of Feb. 11, 2014 Filed Jun. 20, 2014, 10 pages.

\* cited by examiner

| COORDINATE TABLE 245 | | |
|---|---|---|
| DEVICE 301 | RTT 302 | COORDINATES 303 |
| LANDMARK SERVER 110(1) | | |
| LANDMARK SERVER 110(2) | 28.28 | 0, 40 |
| LANDMARK SERVER 110(3) | 63.24 | 40, 40 |
| LANDMARK SERVER 110(4) | 84.86 | 40, 0 |
| CONTENT SERVER 120(1) | | |
| CONTENT SERVER 120(2) | | |
| CONTENT SERVER 130 | | |
| LOCAL – CLIENT DEVICE 140 | | 10, 30 |

FIG. 3A

| COORDINATE TABLE 245 | | |
|---|---|---|
| DEVICE 301 | RTT 302 | COORDINATES 303 |
| LANDMARK SERVER 110(1) | | |
| LANDMARK SERVER 110(2) | 28.28 | 0, 40 |
| LANDMARK SERVER 110(3) | 63.24 | 40, 40 |
| LANDMARK SERVER 110(4) | 84.86 | 40, 0 |
| CONTENT SERVER 120(1) | | |
| CONTENT SERVER 120(2) | | |
| CONTENT SERVER 130 | 20 | 30, 30 |
| LOCAL – CLIENT DEVICE 140 | | 20, 30 |

FIG. 3B

| COORDINATE TABLE 245 | | |
|---|---|---|
| DEVICE 301 | RTT 302 | COORDINATES 303 |
| WIRED INTERFACE | | |
| LANDMARK SERVER 110(1) | | |
| LANDMARK SERVER 110(2) | 28.28 | 0, 40 |
| LANDMARK SERVER 110(3) | 63.24 | 40, 40 |
| LANDMARK SERVER 110(4) | 84.86 | 40, 0 |
| CONTENT SERVER 120(1) | | |
| CONTENT SERVER 120(2) | | |
| CONTENT SERVER 130 | | |
| LOCAL – CLIENT DEVICE 140 | | 10, 30 |
| WIRELESS INTERFACE | | |
| LANDMARK SERVER 110(1) | 106.26 | 0, 0 |
| LANDMARK SERVER 110(2) | | |
| LANDMARK SERVER 110(3) | 20.00 | 40, 40 |
| LANDMARK SERVER 110(4) | 60.00 | 40, 0 |
| CONTENT SERVER 120(1) | | |
| CONTENT SERVER 120(2) | | |
| CONTENT SERVER 130 | | |
| LOCAL – CLIENT DEVICE 140 | | 40, 30 |

FIG. 7

DISTRIBUTED NETWORK COORDINATE SYSTEM BASED ON NETWORK PERFORMANCE

BACKGROUND

The quality of a user's experience on a network can be greatly impacted by conditions on the network, such as latency and available bandwidth between the user's device and one or more servers. For example, in highly interactive client-server applications, a user at a client device may make repeated requests for content from a server. Even if there is sufficient bandwidth between the client device and the server to enable relatively rapid transfers of large files, long latency times can contribute to a frustrating user experience where the server does not appear to be responsive to the client device. Conversely, in client-server applications that involve large data transfers but relatively few client-server interactions, short latency times cannot overcome the drawbacks of insufficient bandwidth to provide acceptable transfer times for the data.

In many cases, a given online service may be associated with a number of servers that are capable of providing the online service to client devices. One way to address the considerations outlined above is to direct each client device to a preferred server that is capable of providing a high quality of service to the user. However, existing techniques for directing a client device to a server often result in the client device communicating with a server that is not ideal for providing a quality user experience. Moreover, existing techniques often overload certain servers while leaving other servers relatively underutilized.

As an example, client devices often request access to an online service by providing a domain name to a Domain Name Service ("DNS") server. In response, the DNS server will provide the client device with a list of one or more servers that may be located in geographic proximity to the DNS server. Thus, it is the geographic location of the DNS server that is often determinative of which server a client device will use to access a web service. However, the client device may be located relatively far away from the DNS server. Moreover, network latency and bandwidth are not always directly correlated to geographic proximity, and, in some cases, servers that are relatively far away from a client device in physical distance may be able to provide a higher quality of service than servers that are physically closer to the client device.

SUMMARY

This document relates to computer networks. One technique stores an initial network location of a first device in a network that also includes a second device. The technique may include monitoring one or more network performance metrics related to existing application communications with the second device. The technique may also include determining an updated network location of the first device, based on the initial network location and the network performance metrics.

Another implementation is manifested as a system that includes a storage device and a manipulation component. The storage device may be configured to store a first network location of a content server or a client device in a network. The manipulation component may be configured to manipulate the first network location of the client device or the content server to a second network location.

Another implementation is manifested as a technique that determines first network coordinates for devices. The first network coordinates may identify respective first network locations of the devices in a network. The technique may also include determining second network coordinates for the devices. The second network coordinates may identify respective second network locations of the devices in the network. The technique may also include calculating, for the devices, differences between the first network coordinates and the second network coordinates. The differences may reflect movement within the network by the individual devices. The technique may also include identifying a subset of the individual devices for further processing, based on the differences.

The above listed examples are intended to provide a quick reference to aid the reader and are not intended to define the scope of the concepts described herein.

BRIEF DESCRIPTION OF THE DRAWINGS

The accompanying drawings illustrate implementations of the inventive concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

FIGS. 3A, 3B, and 7 show examples of data structures stored by certain devices, in accordance with some implementations of the present concepts.

DETAILED DESCRIPTION

Overview

This document relates to a distributed coordinate system that can be employed in a client/server processing model, among others. More specifically, embodiments disclosed herein may advantageously use the network locations of certain network devices to various ends.

In a first scenario, generally illustrated with respect to FIGS. 1, 2A, 2B, 2C, 3A, 3B, and 4, a client device may determine its location, e.g., network coordinates, in a network system. The network system may include several landmark servers that act as "beacons" to enable the client device to self-locate, e.g., determine its own coordinates. The network system may also include several content servers. The client device may communicate with the content servers over the network system, and update its own location based on these communications.

Figure 5:
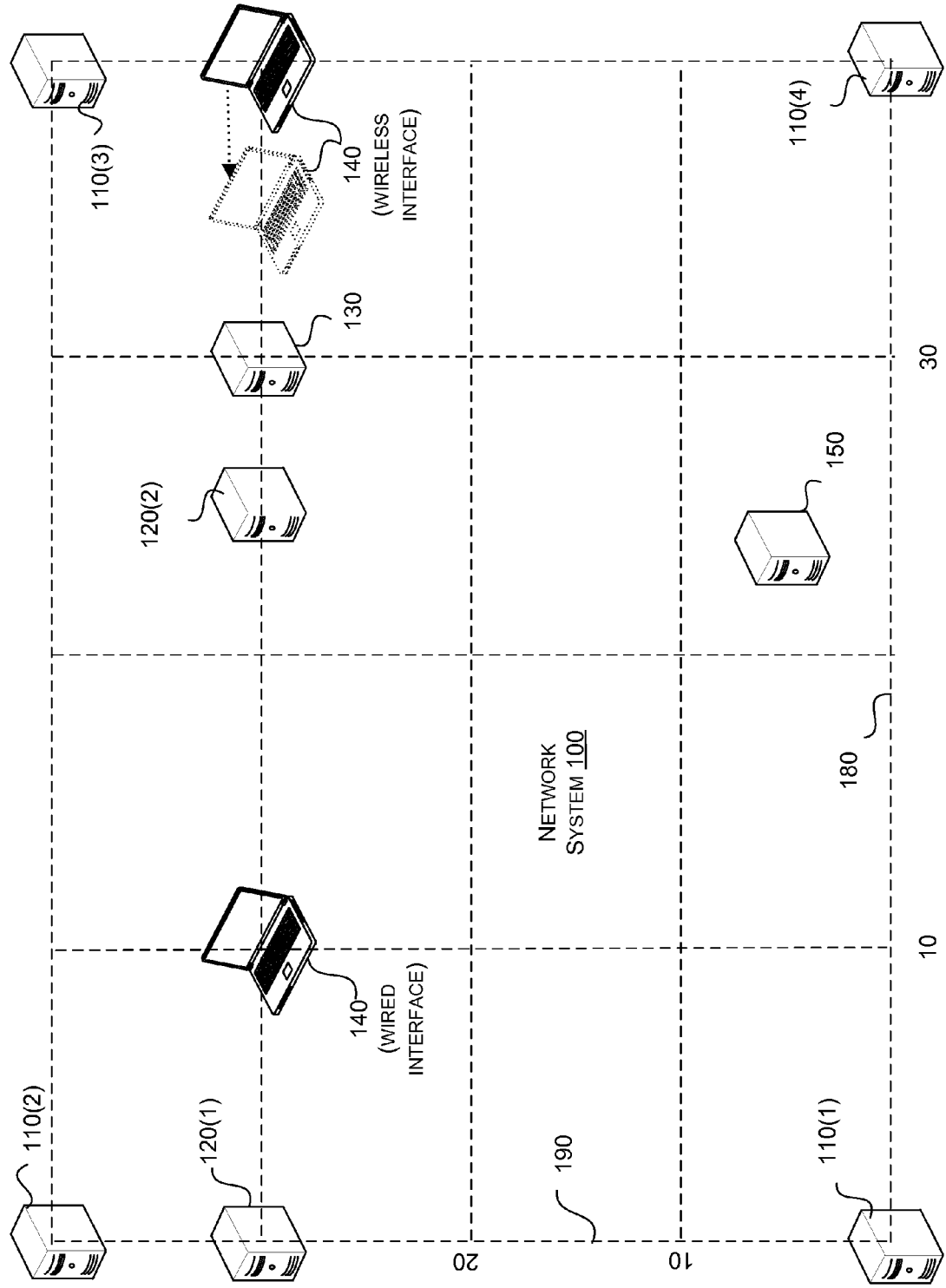
Figure 6:
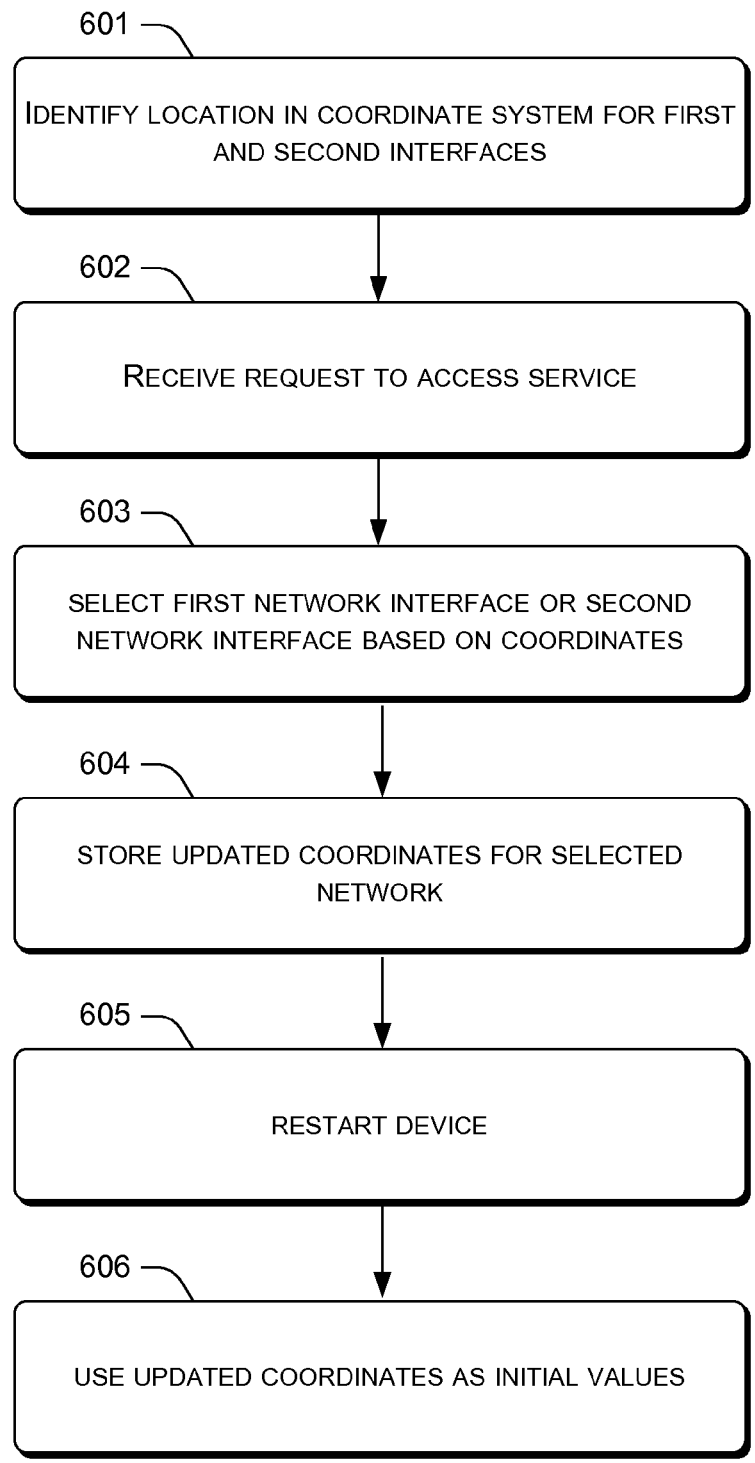

In a second scenario, generally illustrated with respect to FIGS. 5, 6, and 7, network access via multiple interfaces is introduced. The client device may communicate with landmark and/or content servers using a first (e.g., wired) interface to determine its own location on the network system. The client device may also communicate using a second (e.g., wireless) interface to determine another location on the network system. Thus, the client device may be located at different coordinates within the network system, depending on which interface is being used. Based on its coordinates for the respective interfaces, the client device may select either the first or second network interface for accessing particular web services.

Figure 8:
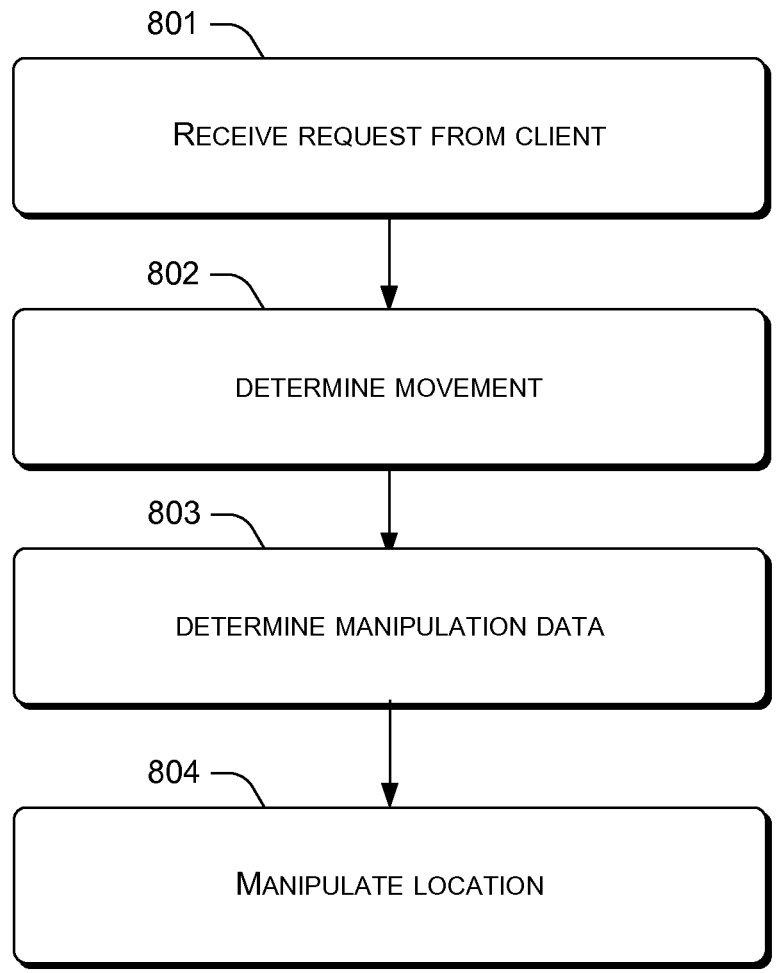

In a third scenario, generally illustrated with respect to FIG. 8, manipulation of network locations is disclosed. For example, a server may have a first location in a network system. The server may manipulate the first location to a second location within a network system, for example by responding to a client request with the manipulated second location. In some implementations, the server may determine that the requesting client device should access another server. The server may manipulate its own location to be further away from the requesting client device, so that the client will access the other server.

Figure 9:
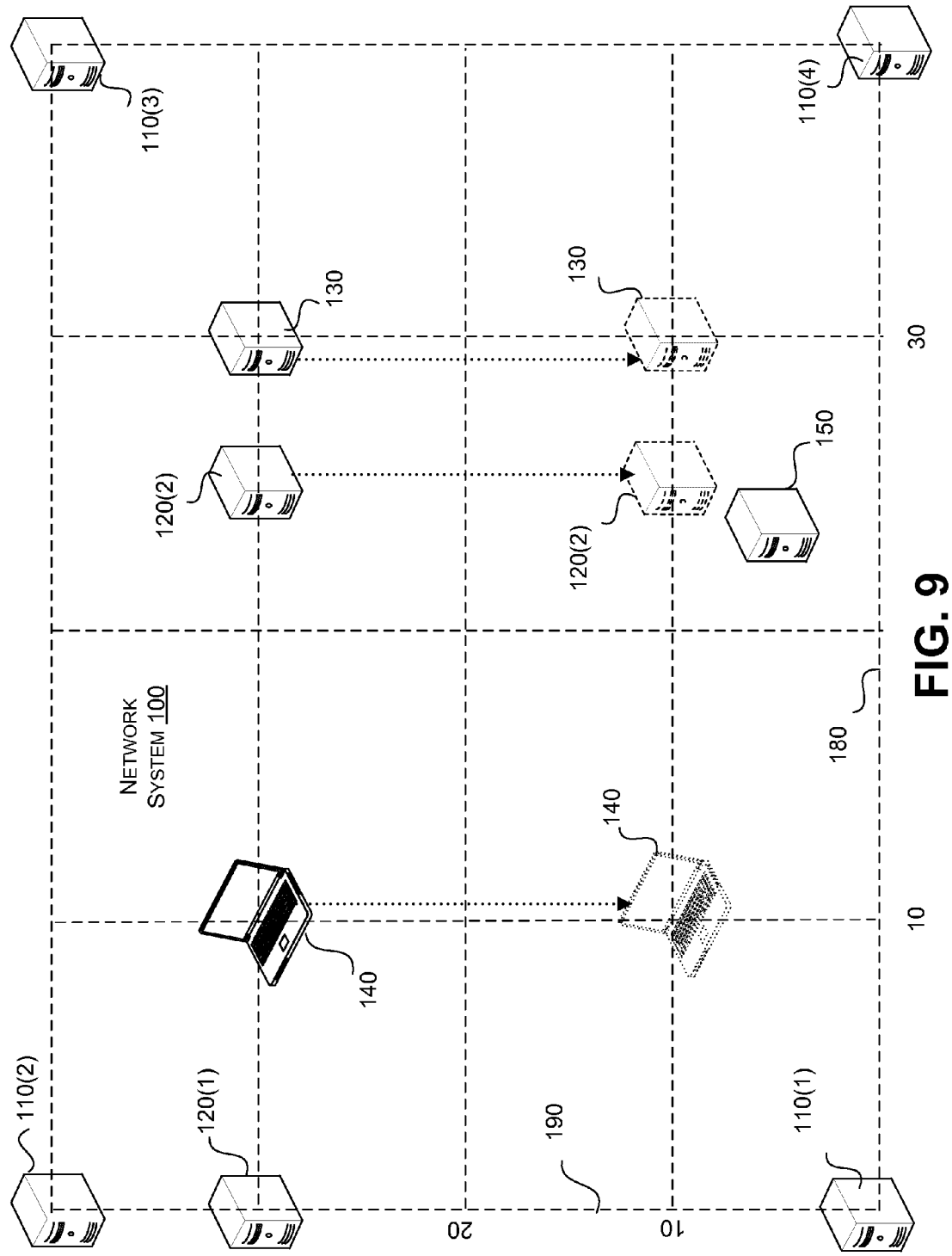
Figure 10:
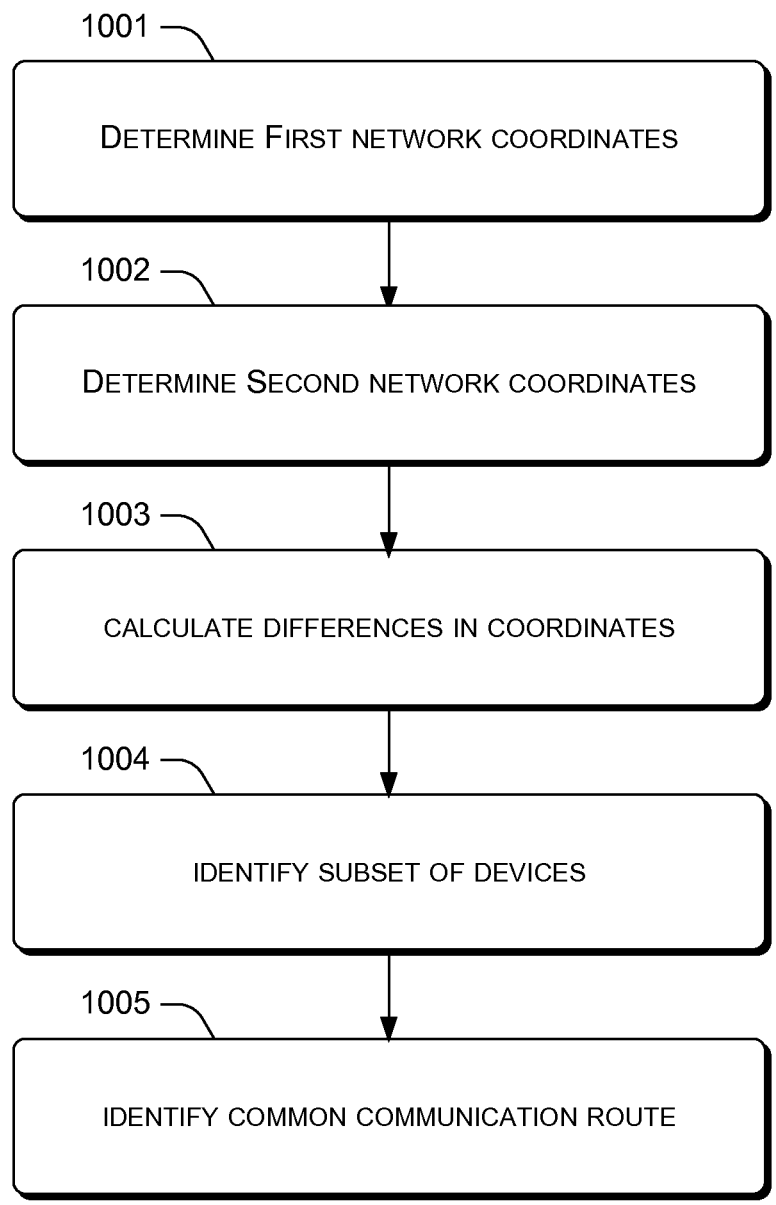

In a fourth scenario, generally illustrated with respect to FIGS. 9 and 10, exemplary diagnostic techniques are disclosed. For example, over time, certain devices may move within a network coordinate system. The movement of the devices may be used to identify a particular network condition, such as a congested router, on the network.

First Scenario

Figure 1:
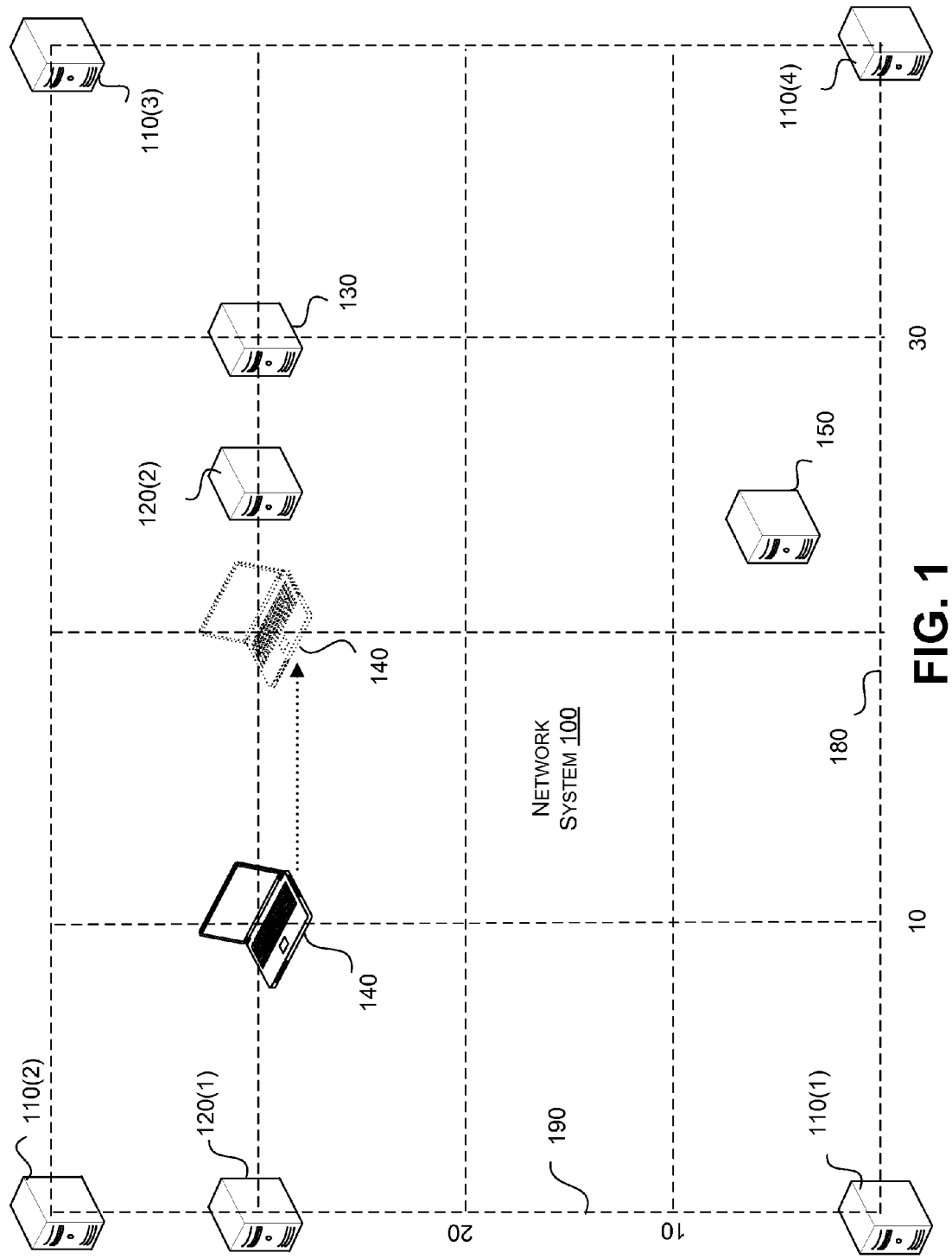
FIGS. 1, 5, and 9 show examples of network systems in accordance with some implementations of the present concepts.

Consider FIG. 1, which shows examples of a network system 100. Network system 100 can include a plurality of devices capable of communicating over network system 100. For example, network system 100 may include landmark servers 110(1), 110(2), 110(3), and 110(4), content servers 120(1), 120(2), and 130, client device 140, and DNS server 150. For convenience, individual components of network system 100 will be identified by including the parenthetical reference number, e.g. landmark server 110(1). The parenthetical reference number will be omitted when referencing components collectively, e.g., the term "landmark servers 110" may generally refer to one or more of landmark servers 110(1), (2), (3), and/or (4).

The terms server (e.g., landmark server or content server), machine, computer, and device (e.g., client device), as used herein, may be understood to refer to any device that can send or receive data. For example, these terms may be understood to refer to any of: a physical server, a virtual machine that runs on a server (e.g., using virtualization technology), a computing device running a single operating system, a computing device running more than one operating system, computing devices running different operating systems (e.g., Microsoft Windows™, Linux™, FreeBSD™), a computing device other than a server (e.g., a laptop, addressable power supply), or a portion of a computing device (e.g., a network attached disk, network-attached memory, a storage subsystem, a storage area network (SAN), a graphics processing unit, a numerical accelerator, or a quantum computing device).

The terms network and network system, as used herein, may be understood to refer to one or more communication channels that enable communication between entities. For example, the term network may include one or more wired or wireless communication channels used to implement one or more local area networks ("LANs"), wide area networks ("WANs"), the Internet, virtual private networks ("VPNs"), intranets, extranets, or combinations thereof. Exemplary wireless networks may implement 3G and 4G mobile communications, Wi-Fi LANs, and Bluetooth connections. Exemplary wired networks can include dial-up, cable, digital subscriber line (DSL), integrated services digital network (ISDN), and Ethernet technologies, among others. A network system may include devices such as routers, hubs, and switches, as well as endpoints (e.g., clients and servers) that communicate over the network system.

As shown in FIG. 1, network system 100 may include one or more landmark servers 110. FIG. 1 may be conceptualized as a representation of a two-dimensional network coordinate system, where each dotted line is separated by 10 units of coordinate space. The coordinate system may include a horizontally-oriented x axis 180, and a vertically-oriented y axis 190. Landmark servers 110, content servers 120 and 130, client device 140, and DNS server 150 are illustrated at approximately their respective network coordinates in FIG. 1. For example, landmark server 110(1) at (0, 0) is shown at the bottom left corner of FIG. 1. Likewise, landmark server 110 (3) is shown in the upper right corner of FIG. 1, at (40, 40). As will be discussed in more detail below, FIG. 1 depicts client device 140 at two different coordinates, e.g., (10, 30) and (20, 30), to reflect movement of client device 140 within the coordinate system.

Generally speaking, landmark servers 110 may act to establish a network coordinate system over network system 100. For example, landmark servers 110 may each have a corresponding global set of network coordinates within network system 100. In some embodiments, the network coordinates for each landmark server 110 are static, and do not change. Moreover, for the purposes of discussion, the network coordinates of each landmark server 110 will remain consistent through the following discussion. Exemplary circumstances where the coordinates for a given landmark server may change will be detailed below.

Content servers 120 and 130, and client device 140, may be configured to determine their own locations within the network coordinate system with reference to landmark servers 110. For example, content servers 120 and 130, and client device 140, may measure the round-trip time (latency) for communications with one or more of landmark servers 110. Based on the measured latency, content servers 120 and 130 and client device 140 may perform calculations to determine their respective network coordinates. For example, the calculations may implement one or more time difference of arrival (TDOA) or trilateration algorithms.

Generally speaking, client device 140 may also communicate over network system 100 to access one or more web services. For example, content servers 120 may provide access to a first web service, such as a news service, that is accessible at a domain name such as "www.123news.com." Likewise, content server 130 may provide access to a second web service, such as an online search engine, at a domain name such as "www.xyzsearch.com."

As discussed in more detail below, client device 140, for example, may initially determine its local network coordinates by communicating with landmark servers 110. Client device 140 may then query content server 130 to search for news services using the search engine provided by content server 130, and obtain the domain name "www.123news.com" from the search engine as a query result. Client device 140 may update its local network coordinates based on round-trip time from when client device 140 transmitted the query to content server 130 until it received the response from content server 130. Based on the updated network coordinates, client device 140 may then determine whether to access "www.123news.com" at content server 120(1) or 120(2).

Note that landmark servers 110, content servers 120 and 130, and client device 140 are described herein with respect to the functionality implemented by each machine. However, certain functionality described herein may be combined amongst the various machines. For example, in some embodiments, a single server could function as both a landmark server and a content server, e.g. by serving as a beacon with known, possibly fixed coordinates and also providing access to a web service. Likewise, a content server may act as a client device by accessing a web service from another machine. Furthermore, the various processing disclosed herein for each machine may be distributed across multiple machines. For example, landmark servers 110 and content servers 120 and 130 may be implemented as server farms or racks including several distinct machines operating collectively to provide landmark server and/or content server functionality.

FIG. 1 also illustrates an exemplary domain name service ("DNS") server 150. Generally speaking, client device 140 may obtain internet protocol ("IP") addresses for a given domain name by accessing DNS server 150. For example, client device 140 may send the domain name "www.xyzsearch.com" to DNS server 150, and in response, receive an IP address "IP1" for content server 130. Likewise, client device 140 may send the domain name "www.123news.com" to DNS server 150, and receive IP addresses "IP2" for content server 120(1), and "IP3" for content server 120(2).

As discussed in more detail below, the network coordinates for a given machine do not necessarily reflect geographical locations. Rather, the network coordinates for a given machine identify the location of the machine in the network coordinate system, which is a virtual representation of network distance. As also discussed in more detail below, network coordinates may be defined using network performance metrics, such as latency or bandwidth.

Using latency as an example, each unit on the network coordinate system may correspond to 1 millisecond of time. Thus, a packet sent from landmark server 110(1) to landmark server 110(4) would travel from (0, 0) to (40, 0), in a time of 40 milliseconds. Moreover, the round-trip time for such a packet would take 80 milliseconds, e.g. to travel the 40 units on the x axis back to landmark server 110(1). However, note that coordinates derived using certain techniques, such as TDOA or Vivaldi algorithms will not necessarily have a fixed mapping between time units and network coordinate units. Nevertheless, some described implementations will use a fixed correspondence between time and network coordinate units to facilitate the discussion, unless otherwise noted.

Furthermore, for the sake of brevity and clarity, the initial discussion of the network coordinate system will make certain simplifying assumptions. For example, the round-trip time for a packet from landmark server 110(1) to landmark server 110(4) may normally include some delay for processing of the packet by landmark server 110(4). Unless otherwise indicated, such processing will be assumed to be instantaneous to simplify the discussion of the network coordinate system, but may be accounted for in other embodiments.

Furthermore, the discussion will focus on a two-dimensional network coordinate system for clarity. However, in certain embodiments, the network coordinate system may include 1, 3, 4, or further numbers of dimensions. Experimental results suggest, however, that using more than four dimensions for a network coordinate system can result in diminishing returns at approximating true network conditions, given the relative complexity of such implementations. Furthermore, while the disclosed embodiments utilize a Cartesian plane for simplicity, embodiments may be implemented in non-Cartesian or non-Euclidean spaces. For example, spherical, elliptical, polar, parabolic, or other coordinate systems may be used.

Figure 2A:
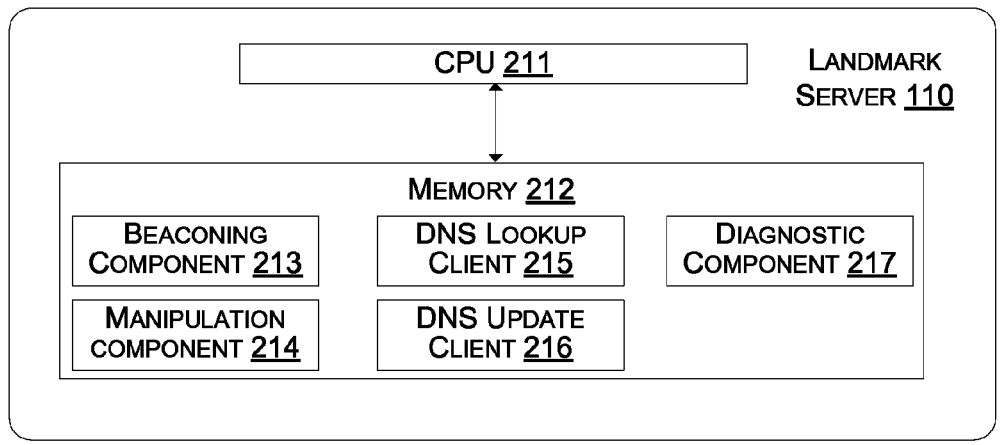
FIGS. 2A, 2B, and 2C show examples of components of certain devices, in accordance with some implementations of the present concepts.
Figure 2B:
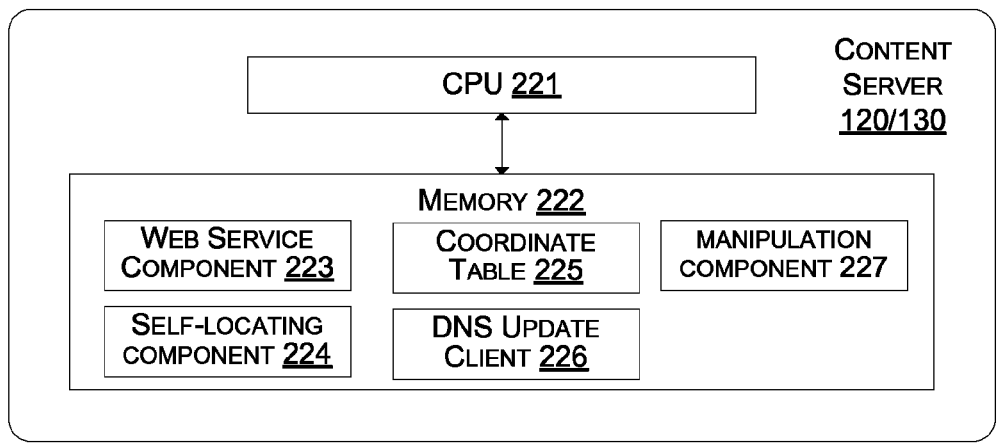
Figure 2C:
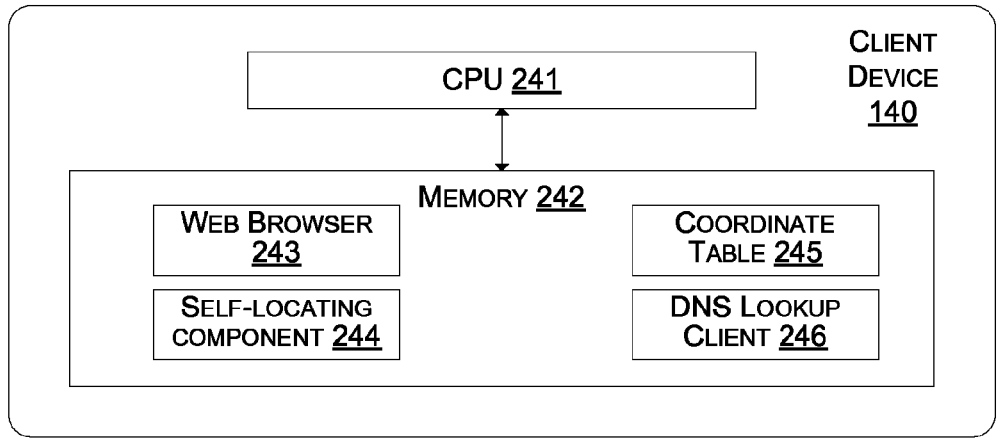

FIGS. 2A, 2B, and 2C generally illustrate exemplary architectures of landmark servers 110, content servers 120 and 130, and client device 140, respectively.

FIG. 2A illustrates an exemplary architecture of landmark server 110. Landmark server 110 may include a central processing unit ("CPU") 211, operably connected to a memory 212. For example, CPU 211 may be a reduced instruction set computing (RISC) or complex instruction set computing (CISC) microprocessor, connected to memory 212 via a bus. Memory 212 may be a volatile storage device such as a random access memory (RAM), or non-volatile memory such as FLASH memory. Although not shown in FIG. 2A, landmark server 110 may also include various input/output devices, e.g., keyboard, mouse, display, printer, etc. Furthermore, landmark server 110 may include one or more non-volatile storage devices, such as a hard disc drive (HDD), optical (compact disc/digital video disc) drive, tape drive, etc. Generally speaking, any data processed by landmark server 110 may be stored in memory 212, and may also be committed to non-volatile storage as needed.

Memory 212 of landmark server 110 may include various components that implement certain processing described herein. For example, memory 212 may include a beaconing component 213, a manipulation component 214, a DNS lookup client 215, a DNS update client 216, and a diagnostic component 217. Each component 213-217 may include instructions stored in memory 212 that may be read and executed by CPU 211. Furthermore, components 213-217 may also be stored in non-volatile storage and retrieved to memory 212 as needed to implement the processing described herein.

Beaconing component 213 may generally be operable to provide a "beacon" for client device 140 and content servers 120 and 130 to self-locate on network system 100. For example, beaconing component 213 may receive beacon requests over network system 100, and provide a beacon response to the requesting machine. Client device 140 and content servers 120 and 130 may self-locate by performing certain calculations based on the time difference between sending their beacon requests and receiving beacon responses, i.e., the round-trip time or latency.

Manipulation component 214 may generally be operable to manipulate the location of client device 140 and content servers 120 and 130 on network system 100. For example, manipulation component 214 may cause client device 140 to self-locate to manipulated locations within network system 100. By doing so, landmark server 110 may make client device 140 appear closer to or further from a particular content server 120, as discussed in more detail below.

DNS lookup client 215 may be used by landmark server 110 to look up DNS entries, e.g., IP addresses, for content servers 120 and 130. DNS update client 216 may be used by landmark server 110 to update a DNS entry for landmark server 110. Diagnostic component 217 may be used by landmark server 110 to diagnose certain conditions on network system 100. For example, a congested or failed router may be identified using diagnostic component 217.

FIG. 2B illustrates an exemplary architecture of content servers 120 and 130. Content servers 120 and 130 may generally include similar hardware components as discussed above with respect to landmark server 110. For example, content servers 120 and 130 may include a CPU 221 connected, for example by a bus, to a memory 222. Memory 222 may include CPU-executable components 223, 224, 225, 226, and 227.

Web service component 223 may provide a web service to client device 140 over network system 100. For example, web service component 223 may represent a news service "www.123news.com" on content servers 120(1) and 120(2), and may represent a search engine "www.abcsearch.com" on content server 130.

Self-locating component 224 may perform processing for content servers 120 and 130 to self-locate on network system 100, for example by calculating their local coordinates. For example, self-locating component 224 may communicate over network system 100 with beaconing component 213 on one or more of landmark servers 110, and derive local network coordinates based on the round-trip latency of the communications. Self-locating component 224 may also update its local network coordinates with reference to other content servers, e.g., self-locating component 224 of content server 120(1) may update its local coordinates based on the latency of communications with content servers 120(2) or 130.

Self-locating component 224 may store data related to the self-locating in coordinate table 225. DNS update client 226 may perform certain operations to populate DNS entries for content servers 120 and 130 on DNS server 150. For example, DNS update client 226 may provide IP addresses and network coordinates to DNS server 150, which may then store the DNS entries for subsequent retrieval by various DNS lookup clients.

FIG. 2C illustrates an exemplary architecture of client device 140. Client device 140 may generally include similar hardware components as discussed above with respect to landmark server 110 and content servers 120 and 130. For example, client device 140 may include a CPU 241 connected, for example by a bus, to a memory 242. Memory 222 may include CPU-executable components 243, 244, 245, and 246.

Web browser 243 may access web services available from content servers 120 and 130 via web service component 223, and display content obtained from the content servers to users of client device 140. For example, web browser 243 may obtain a news web page from content server 120(1) or 120(2), and may obtain a search portal page from content server 130.

Self-locating component 244 may perform similar operations as discussed above with respect to self-locating component 224 of content servers 120/130. Likewise, coordinate table 245 may store similar data as discussed above with respect to coordinate table 225. DNS lookup client 246 may perform similar operations as discussed above with respect to DNS lookup client 215 of landmark server 110.

FIGS. 3A and 3B represent an exemplary coordinate table 245 that may be maintained by self-locating component 244 on client device 140. In particular, FIGS. 3A and 3B represent coordinate table 245 as stored on client device 140 at two distinct points in time, as discussed in more detail below. Generally speaking, FIG. 3B represents an updated version of coordinate table 245, relative to the version of coordinate table 245 shown in FIG. 3A.

As shown in FIGS. 3A and 3B, coordinate table 245 may include a device column 301, which identifies various devices on network system 100, e.g., landmark servers 110 and content servers 120 and 130. RTT column 302 may identify the round-trip latency time in milliseconds observed from client device 140 for communicating with the device identified in device column 301. For example, the round-trip time for communicating with landmark server 110(2) may be 28.28 milliseconds for client device 140. Coordinates column 303 may identify the location in network coordinates for each device in device column 301. Note the term "local" is used to identify the device storing coordinate table 245. Thus, as FIGS. 3A and 3B represent coordinate table 245 on client device 140, the term "local" is used in device column 301 for clarity. While client device 140 will generally retain the network coordinates for each device until they are updated, the round-trip times in RTT column 302 may be deleted or overwritten in memory once they have been used to calculate the local coordinates.

Figure 4:
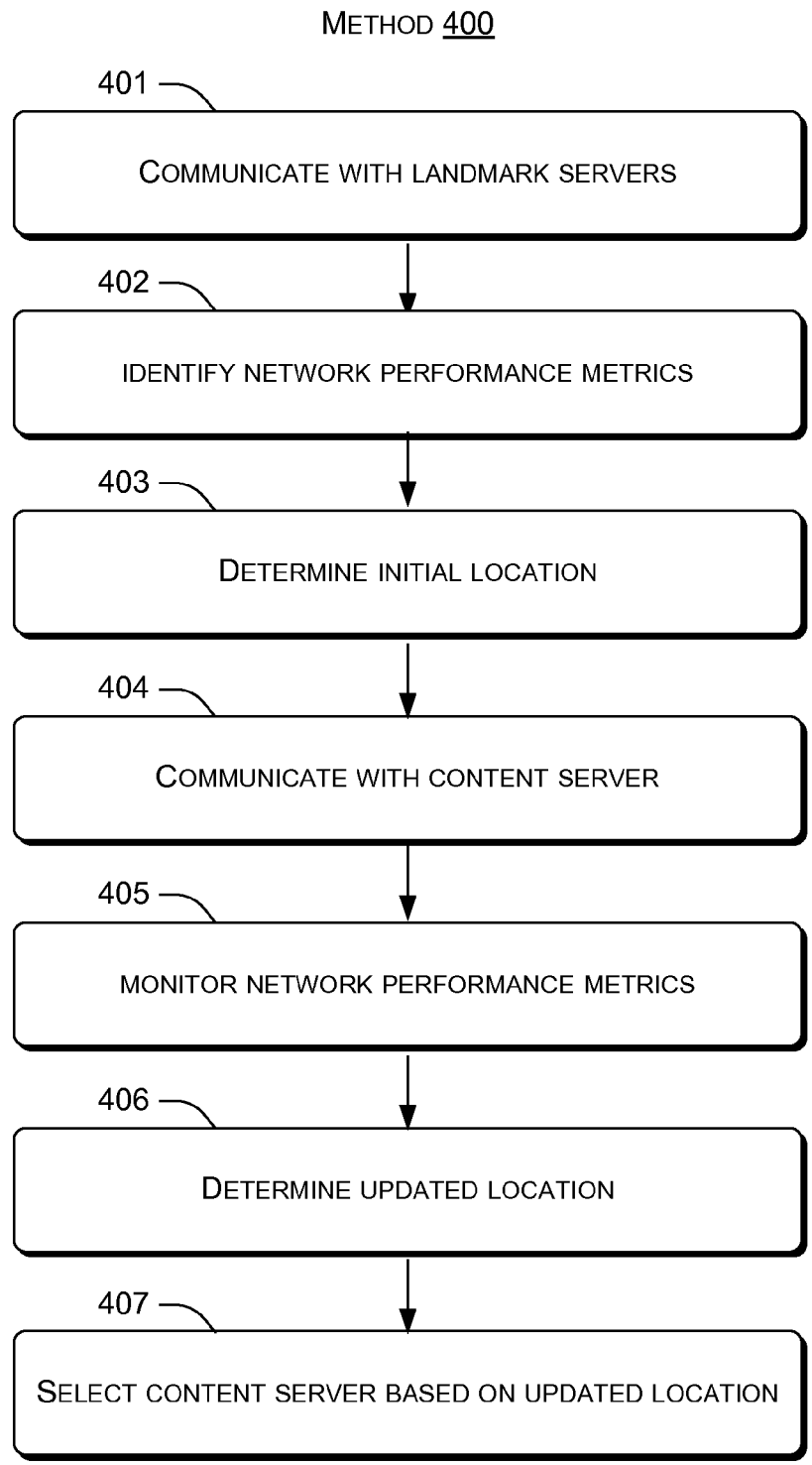
FIGS. 4, 6, 8, and 10 show flowcharts of exemplary methods that can be accomplished in accordance with some implementations of the present concepts.

FIG. 4 illustrates an exemplary method 400. As discussed below, method 400 may be implemented, for example, by self-locating component 244 of client device 140 to determine the local coordinates of client device 140 on the network coordinate system. Using method 400, client device 140 may also access web services such as the online search engine associated with "www.xyzsearch.com" and the news service associated with "www.123news.com." For the purposes of discussion, the network coordinate system shown in FIG. 1 is assumed to be based entirely on latency measurements between the various machines. Embodiments using other network performance metrics, such as bandwidth, to establish the network coordinate system will be discussed afterwards.

Method 400 begins at block 401, which involves communicating with landmark servers. In the context of the present example, client device 140 may communicate with one or more of landmark servers 110. Client device 140 may transmit a location request in one or more packets over network system 100, for example to landmark servers 110(2), (3), and (4). Landmark servers 110(2), (3), and (4) may respond to the location request with a beacon response.

Next, block 402 involves identifying network performance metrics. In the context of the present example, client device 140 may identify network performance metrics associated with the location request(s) and beacon response(s). For example, client device 140 may determine the round-trip time from the transmission of the location request to the receipt of the beacon response, from each landmark server. Client device 140 may also record these values in coordinate table 245, as shown in FIG. 3A. For example, the round-trip time for landmark server 110(2) is 28.28 milliseconds, for landmark server 110(3) is 63.24 milliseconds, and for landmark server 110(4) is 84.84 milliseconds.

Next, block 403 involves determining an initial location. In the context of the present example, client device 140 may determine an initial network location, e.g., a set of network coordinates locating client device 140 on network system 100. For example, client device 140 may determine an initial set of local coordinates (10, 30) as shown in FIG. 3A. Note that client device 140 did not necessarily need to communicate with all of landmark servers 110 to identify this initial set of local coordinates.

However, in some embodiments, it is preferable for client device 140 to communicate with additional landmark servers when locating within a particular coordinate system. Up to a point, client device 140 may reduce the amount of time to converge on a set of coordinates by communicating with additional landmark servers. The optimal number of landmark servers may be dependent on the number of content servers, number of coordinate dimensions, characteristics of the coordinate space, and network conditions such as variability in round-trip times. For example, additional landmark servers may be desirable in embodiments with additional coordinate dimensions, to provide client device 140 with beacons at different locations in each dimension. Using additional landmark servers may also reduce the effect of any inaccuracies in latency measurements with a particular landmark server. Optimization techniques may also be applied to speed convergence and reduce measurement errors.

Next, block 404 involves communicating with a content server. In the context of the present example, client device 140 may communicate with content server 130. For example, a user may enter the string "www.xyzsearch.com" in web browser 243. Client device 140 may then obtain the IP address for content server 130, e.g., IP1, from DNS server 150. Client device 140 may then transmit a request to content server 130, for example including the search term "news." Content server 130 may respond with user data, such as a domain name for "www.123news.com," which the user can subsequently use to access the news service available from content servers 120(1) and 120(2).

Next, block 405 involves monitoring network performance metrics. In the context of the present example, client device 140 may monitor certain network performance metrics associated with the communications with content server 130. For example, client device 140 may determine that the round-trip time (e.g., latency) for communicating with content server 130 is 20 milliseconds. As shown in FIG. 3B, client device 140 may add this value to coordinate table 245.

Next, block 406 involves determining an updated location. In the context of the present example, client device 140 may update its location based on the latency for communicating with content server 130. For example, client device 140 may determine that, based on the location of content server 130 at (30, 30) and a round-trip time of 20 milliseconds, client device 140 is 10 units away from content server 130 in the network coordinate system. Furthermore, because content server 130 and client device 140 have identical coordinates in the y direction (e.g., 30), all movement by client device 140 may be in the x direction. Thus, client device 140 may determine that its initial x coordinate of (10) needs to be updated to (20), e.g., 10 units away from content server 130. As shown in FIG. 3B, client device 140 may then record its updated location, (20, 30), in coordinate table 245. Note that FIG. 1 illustrates the updated location for client device 140 using a shaded icon at location (20, 30).

Next, block 407 involves selecting a content server based on the updated location. In the context of the present example, client device 140 may select a content server for accessing "www.123news.com" using the updated network coordinates. For example, client device 140 may request DNS resolution of "www.123news.com" from DNS server 150. DNS server 150 may respond with IP addresses and network coordinates for content servers 120(1) and 120(2), respectively. For example, DNS server 150 may provide an IP address of IP2 and network coordinates of (0, 30) for content server 120(1), and an IP address of IP3 and network coordinates of (30, 30) for content server 120(2).

Client device 140 may then select the content server for accessing the news service based on its updated location and the locations of content servers 120(1) and 120(2), respectively. For example, client device 140 may select the content server with the shortest network distance. Thus, because content server 120(2) is located 5 units away at (25, 30), while content server 120(1) is located 20 units away at (0, 30), client device 140 may select content server 120(2).

Note that, in the example discussed above, client device 140 would have selected content server 120(1) prior to updating its location based on the communications with content server 130. This is because the initial location of client device 140 at (10, 30) is closer to content server 120(1) (e.g., 10 network units) than content server 120(2) (e.g., 15 network units).

Furthermore, note that the updated network location of client device 140 may reflect various changes in the connectivity of client device 140. For example, if client device 140 is a mobile device such as a cell phone, PDA, or laptop, the movement of client device 140 within the network coordinate system may be caused at least partly by moving client device 140 to a new physical location. However, even if client device 140 is stationary, e.g., a desktop computer or server, client device 140 may still move within the network coordinate system. This movement may be caused by changes in the connectivity available over network system 100.

As an example, a router that is used by client device 140 to communicate with devices located "left" or in the negative x direction may have failed or become congested. This may cause increased latency for communications by client device 140 in the negative x direction, even in the absence of any physical movement by client device 140. Thus, it may be advantageous for client device 140 to access "www.123news.com" at content server 120(2), rather than content server 120(1), in view of the likelihood of increased latency for communications with content server 120(1).

Note also that, in the example above, client device 140 was successfully able to update its location without using dedicated probing traffic to discover its updated location. Rather, network traffic was used to obtain user data from content server 130, such as a web page. Network performance metrics relating to this existing application traffic were used to update the location for client device 140. This is advantageous, in that dedicated probing traffic may incur substantial overhead costs. For example, dedicated network probing may involve processor and memory utilization on both client device 140 and one or more of content servers 120(1), 120(2), and 130. Furthermore, dedicated network probing would result in traffic on network system 100 that is dedicated to carrying probing communications. In contrast, client device 140 was able to leverage processor and memory utilization and network traffic associated with accessing the search engine "www.abcsearch.com" to update its location.

Algorithmic Considerations

In the discussion above, certain simplifying assumptions were made to facilitate the discussion of certain embodiments. However, the embodiments disclosed herein are compatible with various algorithms used in distributed network coordinate systems, as discussed below.

For example, the units of the network coordinate system were defined above in terms of milliseconds of latency, e.g., 1 unit equals 1 millisecond of one-way travel, or 2 milliseconds of round-trip time. However, in some embodiments, e.g. using TDOA techniques, the relative differences in latency, rather than absolute time values, may be used to determine network coordinates.

As an example, consider a device (not shown) located at coordinates (20, 20), and that communicates with each of landmark servers 110 to establish an initial location. Such a device is equidistant from each landmark server, approximately 28.28 units on the network coordinate system. Thus, using a fixed mapping of one millisecond to one network coordinate unit, a device would only be located at (20, 20) if the round-trip times for communicating with each landmark server 110 were approximately 28.28*2=56.56 milliseconds.

However, method 400 may also be implemented using a time difference of arrival (TDOA) approach. Using such an approach, a device may instead be located at (20, 20) provided the latency between the device and each landmark server is equivalent, regardless of the actual latency in seconds to each landmark server. Thus, using a TDOA approach, the absence of any difference between the latency times for communicating with the landmark servers is indicative that a device is equidistant from each of the landmark servers. Likewise, location updates such as those discussed above, in particular with respect to steps 405 and 406, may also be implemented using TDOA techniques, e.g., the communications with content server 130.

Furthermore, the embodiments disclosed herein may be compatible with distributed coordinate algorithms, such as Vivaldi's algorithm. In such embodiments, client device 140 may continually adjust its local coordinates to minimize errors with respect to the measured round-trip times to other devices on network system 100. In further embodiments, latitude and longitude or other geographical locations may be used to bootstrap an initial set of network coordinates for client device 140. In such embodiments, the measured round-trip times may be used to refine the initial set of coordinates, as discussed above. Alternatively, the initial location may be determined as discussed above at block 403 of method 400, i.e., with respect to landmark servers 110. Using fixed or global coordinates for landmark servers 110 may accelerate the convergence time of such an algorithm.

In addition, note that distributed coordinate algorithms may use more than one round-trip measurement to calculate a set of coordinates. For example, blocks 401 and 404 of method 400 may include multiple communications with landmark servers 110 and content server 130, respectively. Blocks 402 and 405 may include statistical processing of the round-trip measurements, such as calculating an exponential moving average of the round-trip times between client device 140 and landmark servers 110 and content server 130. In such embodiments, coordinates may be calculated based on the average latency, rather than a single measurement. In further embodiments, minimum or median round-trip times may be used with or instead of the average times.

Furthermore, distributed coordinate algorithms may introduce a notion of confidence and/or error for each round-trip measurement. Note that in block 406 of method 400, client device 140 moved a full 10 units in the network coordinate system based on a single communication with content server 130 with a round-trip time of 20 milliseconds. Generally speaking, it may be useful to update the location less than the full 10 units, depending, for example, on confidence values or scores associated with the round-trip times and/or coordinates for content server 130.

In addition, client device 140 may continually update its location within network system 100 based on further communications with landmark servers 110 and content servers 120/130. For example, client device 140 may update its coordinates after receiving a news web page from content server 120(2). Content servers 120/130 may also continually update their coordinates in a like manner as client device 140.

Note also that embodiments of the invention may be implemented without the use of landmark servers 110. Many distributed coordinate algorithms do not require using devices with fixed locations. Nevertheless, landmark servers 110 may serve several useful purposes. First, landmark servers 110 may provide a consistent reference point, useful for other devices to self-locate on network system 100. Furthermore, convergence time to a set of coordinates can be reduced, provided a sufficient number of landmark servers 110 are available.

Obtaining Coordinates

As discussed above, client device 140 may use the coordinates of landmark servers 110 and content server 130 to update its local coordinates. Client device 140 may obtain the coordinates for landmark servers 110 and content server 130 using different techniques, as discussed below.

In some embodiments, the coordinates for landmark servers 110 may be known to be permanent, or fixed for some, perhaps predetermined, period of time. For example, coordinates of landmark servers 110 may maintain constant values for the predetermined period of time, independently of changes in network performance and metrics related to the connectivity of the landmark servers. Thus, it may be feasible for client device 140 to be preconfigured with the known network coordinates for each landmark server. In other embodiments, client device 140 may obtain the coordinates for each landmark server by requesting the coordinates with the beacon request. Because the coordinates may remain constant for some period of time, client device 140 does not necessarily need to constantly update the network coordinates for each landmark server.

However, as also discussed, it may be desirable to periodically update the coordinates of landmark servers 110. For example, if a connection link on network system 100 were removed or restricted in a given area of the network coordinate system, it may be expected that one or more landmark servers may experience increased latency as a result of this physical change to network system 100. Under such circumstances, it may be desirable to assign the affected landmark servers new coordinates to "move" them away from the client devices and content servers that will no longer be able to use the removed connection link. Likewise, if a communication link is added or its capacity expanded, it may be desirable to assign the affected landmark servers new coordinates to "move" them closer to the client devices and content servers that will be able to take advantage of the added/expanded link. In still further embodiments, landmark servers 110 may periodically self-locate using techniques such as method 400. In such embodiments, landmark servers 110 may be provided with a self-locating component similar to self-locating components 224 and 244.

In circumstances where landmark servers 110 receive updated coordinates, several methods may be used to provide the coordinates to content servers 120/130 and client device 140. For example, landmark servers 110 may "push" the new coordinates to each device on network system 100 when the new coordinates are assigned. Alternatively, landmark servers 110 may wait for the next beacon request from the devices on network system 100, and respond with the newly-assigned coordinates.

Furthermore, landmark servers 110 may also be associated with a domain name and corresponding DNS entry on DNS server 150. For example, DNS update client 216 on landmark servers 110 may maintain copies of the coordinates for the landmark servers in a text (txt) record on DNS server 150. DNS update client 216 may also update the txt record as desired to reflect newly assigned coordinates. Client device 140 and content servers 120/130 may be configured to request DNS txt records in addition to address records, in order to obtain the coordinates for the landmark servers. Client device 140 may use DNS lookup client 246 for these purposes. In some embodiments, content servers 120/130 may also be configured with a DNS lookup client similar to DNS lookup client 246.

Content servers 120/130 may use similar techniques as discussed above to provide their respective coordinates to client device 140. For example, content servers 120/130 may continually update their coordinates using processing similar that discussed above with respect to method 400, and maintain/update DNS txt records with their current coordinates. In such embodiments, client device 140 may be configured to request the DNS txt records as well as the address records when requesting resolution of a domain name from DNS server 150.

In further embodiments, content servers 120/130 may provide their coordinates to client device 140 directly. For example, client device 140 may obtain a DNS address record with the IP address for content server 120(1). Upon receiving initial communications from client device 140, content server 120(1) may provide its own coordinates to client device 140, as well as the coordinates of other content servers, such as content server 120(2). Client device 140 may compare its own coordinates to the coordinates received from content server 120(1) to determine whether to access "www.123news.com" from content server 120(1) or 120(2).

In some embodiments, content servers 120 and 130 may provide their coordinates to client device 140 in a web page. For example, the home page for "www.123news.com" may include markup language code, such as HyperText Markup Language (HTML) or Extensible Markup Language (XML) code. Content servers 120(1) and 120(2) may include their coordinates in the markup language code. Thus, each time the web page is refreshed at client device 140, client device 140 will obtain the corresponding updated coordinates.

In further embodiments, the web page may include scripting code, such as JavaScript™ or VBScript™. The scripting code may include the coordinates directly, or may be executable by client device 140 to retrieve the coordinates from the corresponding content server. In still further embodiments, the markup language or scripting code from a single content server may include coordinates for multiple content servers. Thus, if client device 140 retrieves the web page from content server 120(1), the web page may include coordinates for both content servers 120(1) and 120(2). In such embodiments, content servers 120(1) and 120(2) may periodically communicate their updated coordinates to one another.

Network Performance Metrics

As discussed above, latency can be used as a metric for defining distance on a network coordinate system. Local coordinates for a given device can be determined based on one-time or moving averages of latency. In some embodiments, landmark servers 110, content servers 120/130, and client device 140 may be configured to implement Transmission Control Protocol Extended Statistics ("TCP ESTATS"). Generally speaking, TCP ESTATS may provide congestion, bandwidth, latency, and other network performance metrics on a connection-by-connection basis. For example, TCP ESTATS directly indicates round-trip time, and indicates packet loss as well as the amount of data that is transferred for a given connection. Accordingly, bandwidth and congestion measurements can be inferred from TCP ESTATS.

Furthermore, TCP ESTATS may be preconfigured on many computing devices, and may operate to monitor TCP traffic whenever a TCP ESTATS-configured device engages in network communication. Thus, for example, communications between client device 140 and content server 130 may use a TCP/IP (Internet Protocol) connection over network system 100. Network performance metrics for the communications may be reflected in the TCP ESTATS information for the TCP/IP connection. Thus, for example, blocks 402 and 405 of method 400 may be implemented by processing TCP ESTATS data for the connections with landmark servers 110 and content server 130, respectively.

Latency is not the only metric suitable for defining the network coordinate system of network system 100. In some embodiments, bandwidth may be used as an alternative measure of distance. Generally speaking, two devices with high available bandwidth between each other may be located more closely on the network coordinate system than two devices with lower available bandwidth. Note, however, that bandwidth measurements may generally involve significantly more network traffic for measurement purposes than latency measurements. This is because a single packet and response may be suitable for determining the latency between two devices, whereas bandwidth measurement may involve transferring substantially more than one packet and response.

Furthermore, composite network performance metrics may also be used to define the network coordinate system. As an example, network distance may be defined based on throughput between two devices, or based on the sum or product of latency and bandwidth. In still further embodiments, the sums and/or products may be weighted to achieve desirable user experiences. Generally speaking, bandwidth and latency measurements may be obtained using network statistics obtained, for example, using TCP ESTATS.

As an example, in embodiments where users are accessing large data files with relatively few server interactions, bandwidth may be weighted relatively heavily. Likewise, in highly interactive applications, bandwidth may be disregarded or weighted relatively lightly. Such weighting mechanisms may be implemented, for example, by multiplying weighting factors by the measured latency and/or bandwidth between any two devices.

Background Location Updates

In the discussion of method 400 above, client device 140 accessed a search engine at content server 130 in response to a user request to search for a news service. The communications associated with the request were used to update the local coordinates of client device 140. Thus, a user's actions in requesting data over network system 100 were leveraged to update the location of client device 140, without incurring the expense of additional probing traffic over network system 100.

However, not all communications from client device 140 are necessarily responsive to user inputs. Rather, in some cases, background processing by web browser 243 may be used to obtain user data over network system 100. For example, web browser 243 may periodically access a time server (not shown) on network system 100, for example to update a clock associated with web browser 243 or the system clock.

In some embodiments, the time server may also have its own set of network coordinates. Thus, client device 140 may implement method 400 using background communications to update its location. As another example, server-side auto completion of user entries in web browser 243 may also be used to update location coordinates, e.g., when the auto completion server has an associated set of network coordinates. Note also that content servers 120 and 130 may also use foreground and/or background requests for user data (e.g., web content, time data, auto completion data, etc.) to update their locations within the coordinate system.

Second Scenario

In some embodiments, client device 140 may have multiple ways to access network system 100. For example, client device 140 may be able to connect to network system 100 using a wired interface, e.g., cable modem, DSL, Ethernet, etc. Client device 140 may also be able to connect to network system 100 using a wireless interface, such as a Wi-Fi or 3G interface. At times, client device 140 may be connected to network system 100 with both interfaces concurrently. At other times, client device 140 may be connected to network system 100 using only one of the two interfaces.

FIG. 5 illustrates network system 100, as discussed above with respect to FIG. 1. However, in FIG. 5, client device 140 is illustrated at several different locations within the coordinate system. When using the wired interface to connect to network system 100, client device 140 may determine its own coordinates to be (10, 30). However, when using the wireless interface to connect to network system 100, client device 140 may initially determine its coordinates to be (40, 30), and subsequently update the coordinates for the wireless interface to (35, 30). Note, however, that the preceding discussion of FIG. 1 is not limited to wired or wireless interfaces, and the embodiments discussed with respect to FIG. 1 may be implemented with wired or wireless interfaces.

For context, it may be useful to consider why a single device such as client device 140 may have different network coordinates for different interfaces. While client device 140 can only be at one geographic location at one time, the latencies to various devices on network system 100 may be very different for different network interfaces. For example, client device 140 may use a wired interface, e.g., a cable modem, to a server operated by the cable ISP. At the same time, client device 140 may use a wireless interface, e.g., 3G, to connect to a server operated by their cell service provider. While client device 140 is at the same physical location for both interfaces, communications to network system 100 are routed through the cable ISP server when using the wired interface, and through the cell provider server when using the wireless interface. The latencies through these two servers to the various devices on network system 100 may be very different, as the two servers may be in different physical locations. Thus, it is possible for client device 140 to have two distinct sets of network coordinates for each interface at the same time. To obtain network coordinates for the respective interfaces, client device 140 may implement techniques such as those discussed above with respect to method 400 to identify its local coordinates for each interface.

Under some circumstances, it may be desirable for client device 140 to access a particular web service using one interface instead of another. Depending upon the respective network coordinates for each interface, client device 140 may be closer to a particular web server when using a particular interface. As an example, client device 140 may wish to access the search engine "www.abcsearch.com" from content server 130 on network system 100. If client device 140 has network coordinates for the wired interface that are closer to content server 130 than the coordinates for the wireless interface, client device 140 may use the wired interface instead of the wireless interface to communicate with content server 130. Generally, client device 140 can choose from several network interfaces to use the interface with lower latency, to provide a better user experience.

FIG. 6 illustrates an exemplary method 600 suitable for implementation, for example, by self-locating component 244 on client device 140.

Block 601 involves identifying a location in the network coordinate system for a first network interface and a second network interface. In the context of the present example, client device 140 may identify its local coordinates within network system 100 for a first, wired interface using techniques similar to those discussed above with respect to method 400. Similarly, client device 140 may also identify its local coordinates within network system 100 for a second, wireless interface. As shown in FIG. 7, client device 140 may include separate RTT measurements and local coordinates in coordinate table 245 for each interface. For example, FIG. 7 illustrates that client device 140 determines its local coordinates for the wired interface to be (10, 30) and for the wireless interface to be (40, 30).

Note that client device 140 does not necessarily need to communicate with the same group of devices on both interfaces when determining its local coordinates. For example, client device 140 may communicate with landmark servers 110(2), (3), and (4) to obtain its local coordinates for the wired interface, and communicate instead with landmark servers 110(1), (3), and (4) for the wireless interface. Likewise, client device 140 may update the coordinates by communicating with different devices using each network interface.

Next, block 602 involves receiving a request to access a service. In the context of the present example, a user of client device 140 may enter a request in web browser 243 to access a network service, such as web service "www.abcsearch.com." At this time, client device 140 may then identify one or more IP addresses associated with "www.abcsearch.com," for example, by obtaining them from DNS server 150. For example, client device 140 may obtain an IP address and network coordinates for content server 130, e.g., IP1 and (30, 30).

Next, block 603 involves selecting from first and second network interfaces. In the context of the present example, client device 140 may select from the wired network interface or the wireless network interface to access "www.abcsearch.com," based on the network coordinates for the respective network interfaces. For example, client device 140 may select the interface with the closest network coordinates to content server 130. Note that, when using the wireless interface, client device 140 is at (40, 30), i.e., 10 units in the positive x direction away from content server 130 at (30, 30). However, when using the wired interface, client device 140 is at (10, 30), which is 20 units away in the negative x direction from content server 130 at (30, 30). Thus, client device 140 may select the wireless interface for accessing "www.abcsearch.com," because the wireless interface is a smaller network distance from corresponding content server 130.

Next, block 604 involves storing updated coordinates for the selected network. In the context of the present example, client device 140 may update its local coordinates for the wireless interface, e.g., based on the communications with content server 130. For example, if low latency conditions exist between content server 130 and client device 140, client device 140 may update its location to move closer to content server 130, e.g., to approximately (35, 30) as shown by the faded icon in FIG. 5. Note that, in some circumstances, client device 140 may determine that its updated coordinates locate client device 140 further away from content server 130 using the wireless interface than using the wired interface. Under such circumstances, client device 140 may start accessing "www.abcsearch.com" using the wired interface.

Next, block 605 may involve restarting a device at some time in the future. In the context of the present example, client device 140 may restart. For the purposes of this example, restarting may include going into a hibernation mode, powering completely off, or simply disconnecting from one or both network interfaces. Client device 140 may also log its current network coordinates for each interface for future reference.

Next, block 606 involves using the updated coordinates as initial values. In the context of the present example, client device 140 may use the most recently updated coordinates for each network interface as initial values for updating its location, for example using one or more steps of method 400. As an example, client device 140 may be reconnected to the wireless interface, and use the updated coordinates of (35, 30) as its initial coordinates for the wireless interface. In such embodiments, client device 140 may not need to perform blocks 401-403 of method 400, i.e., determining its initial location by communicating with landmark servers 110. Instead, client device 140 may immediately begin communicating with content servers 120/130 on network system 100, using the logged coordinates.

As discussed above with respect to FIG. 1, network coordinates may be calculated on a device-specific basis, e.g., for each device in network system 100. In addition, as discussed with respect to FIG. 5, refinements are possible where a single device may have different coordinates for different network interfaces. In still further refinements, each network interface may have more than one set of associated network coordinates, as discussed in more detail below.

Generally speaking, each network interface of client device 140 may communicate over network system 100 through an access network, which connects client device 140 to an internet service provider. In the example discussed above, client device 140 may use a first access network for the wired connection to connect to a cable ISP, and a second access network for the wireless 3G connection to their cell service provider. However, in some cases, client device 140 may use the same interface to connect to multiple access networks.

For example, consider a user at home who connects to a wireless router to access their cable internet service. The user may have some difficulties with their cable internet service, and may decide to use an alternate wireless connection such as a 3G portable connection or a WiMax (Worldwide Interoperability for Microwave Access) connection. Thus, the user is switching from the access network for their cable ISP to a different access network for the alternative wireless connection, while continuing to use the wireless interface.

In such embodiments, client device 140 may calculate and update network coordinates on an access network basis, e.g., a first set of coordinates for the user's cable ISP and a second set of coordinates for the 3G or WiMax connection. Client device 140 may log the coordinates for each respective access network for later use. Thus, if the user switches back from the 3G or WiMax connection to their own wireless router and ISP, client device 140 may use the previously logged coordinates for their own ISP as the initial coordinates. This may speed convergence time for the coordinates as compared with reinitializing the coordinates by communicating with landmark servers 110.

The above-disclosed techniques may also be useful when the user moves between geographical locations. When the user arrives at a new destination, for example, a coffee shop, the user may access a Wi-Fi internet service provided by the coffee shop. The coffee shop may use a different access network than the user's home ISP. Thus, the first time the user connects to the coffee shop Wi-Fi service, client device 140 may implement method 400 in full, e.g., determine an initial set of coordinates and then iteratively update the coordinates as the user browses to various websites. Client device 140 may also log the coordinates for the coffee shop Wi-Fi network. On subsequent visits to the coffee shop, client device 140 may access the most recent set of logged coordinates for the coffee shop and use these as the initial coordinates for the visit.

Third Scenario

Under some circumstances, it may be desirable to manipulate the network coordinates of client device 140 and/or content servers 120/130 to achieve certain outcomes. In particular, the network coordinates of a given device may be manipulated to make the device appear at a location on network system 100 that is different from the "actual" location based on network performance. As an example, content server 120(2) may be configured to make itself appear at a different location than would normally be obtained through actual measurement of latency. Such processing may be implemented in order to cause client device 140 (and other client devices on network system 100) to access a web service at a different content server, e.g., content server 120(1). Thus, by manipulating its own location, content server 120(2) may intentionally redirect client device 140 to content server 120(1), even though content server 120(2) is actually the closest content server in the network coordinate system. This approach may be useful, for example, to reduce the processing load on content server 120(2) for load-balancing purposes, to decommission content server 120(2), or where different (perhaps updated or optimized) content is available from content server 120(1) and not content server 120(2).

Manipulation component 227 on content server 120(2) may implement certain processing to achieve coordinate manipulation of content server 120(2). FIG. 8 illustrates an exemplary method 800 suitable for implementing such techniques. The discussion below is with reference to the locations of the various devices as shown in FIG. 1.

Block 801 involves receiving a request from a client. In the context of the present example, content server 120(2) may receive a request for www.123news.com. For example, the request may be transmitted by client device 140, e.g. as an HTTP request for a web page.

Next, block 802 involves determining a movement within the network coordinate system. In the context of the present example, content server 120(2) may determine a movement of content server 120(2) away from client device 140. For example, content server 120(2) may intend to slowly "decommission" itself by manipulating its own location on network system 100 to appear further away from client device 140. Generally speaking, content server 120(2) may do so by moving itself in any dimension within the network coordinate system. This may have the effect of reducing the workload on content server 120(2) until, eventually, no further requests are received by content server 120(2). At this point, content server 120(2) may be taken totally offline without interrupting the availability of www.123news.com.

For the purposes of the present, two-dimensional example, content server 120(2) will alter the x component of its location, as discussed below. In the case of a three or more dimensional coordinate system, there may also be a height, or z component. In some embodiments, the default height or z component of devices on network system 100 may be 0. Thus, content server 120(2) may simply increase the absolute value of its height component to move itself away from the various devices on network system 100. This may be the case even where actual latency conditions on network system 100 would not normally result in content server 120(2) having an increased height component.

Next, block 803 involves determining manipulation data. In the context of the present example, content server 120(2) may determine manipulation data, e.g., manipulated coordinates, that reflect the movement from (25, 30) to (40, 30). For example, the manipulated coordinates may be included a DNS txt record. Alternatively, the manipulated coordinates may be included in modified markup language or scripting code for the web page associated with "www.123news.com." As discussed, in some embodiments the scripting code does not directly include the coordinates, but rather is executable by client device 140 to retrieve the coordinates. In such embodiments, the manipulation data may be a copy of the updated coordinates that are stored locally by content server 120(2), for subsequent retrieval when the scripting code is executed by client device 140.

Next, block 804 involves manipulating a location. In the context of the present example, content server 120(2) may provide the manipulation data, e.g., the manipulated coordinates, to a remote device such as client device 140. Content server 120(2) may do so either directly or indirectly. In embodiments where the coordinates are included in markup language or scripting code, content server 120(2) may transmit the coordinates to client device 140 with the web page for "www.123news.com." In embodiments where the coordinates are retrieved by the client-executed scripting code, content server 120(2) may provide the coordinates in a communication that is separate from the web page. In embodiments where the coordinates are distributed via DNS txt records, content server 120(2) may indirectly provide its coordinates to client device 140 by uploading a DNS txt record with the manipulated coordinates to DNS server 150.

In some embodiments, it is useful to slowly move content server 120(2) away from client device 140. In such embodiments, content server 120(2) may iteratively implement one or more blocks of method 800. For example, content server 120(2) may manipulate its location 1 unit every day, to slowly move away from one or more client devices. Over a period of several days or weeks, this may result in steadily decreasing workloads for content server 120(2), as fewer client devices will select content server 120(2) to access "www.123new.com." Eventually, content server 120(2) may be moved far enough that every client device on network system 100 is closer to another content server than 120(2), and thus content server 120(2) will be fully decommissioned.

Manipulating Client Coordinates

Under some circumstances, it may be desirable to manipulate the location of client device 140, instead of or in addition to manipulating the location of a content server. For example, landmark servers 110 may use manipulation component 214 to direct client device 140 away from content server 120(2) and/or toward content server 120(1). In such embodiments, landmark servers 110 manipulate the coordinates of client device 140 in several different ways, as discussed below.

One way for landmark servers 110 to manipulate the location of client device 140 is to intentionally delay beacon responses. For example, note that if landmark servers 110(3) and (4) delay their responses to client device 140 in block 401 of method 400, this will have the effect of moving client device 140 in the negative x direction. To do so, landmark servers 110(3) and (4) may calculate an additional latency period sufficient to move client device 140 to the manipulated location. In such embodiments, the additional latency period may be the manipulation data determined at block 803 of method 800. Note that client device 140 is not necessarily aware that its location is being manipulated by landmark servers 110.

However, intentionally introducing latency may have the consequence of slowing down the convergence time for client device 140, because of the delay in receiving the beacon responses. In further embodiments, landmark servers 110 may be configured to provide values in the beacon responses that client device 140 may use to determine its location, as discussed in more detail below. Such implementations may allow landmark servers 110 to respond immediately to beacon requests while still manipulating the location of client device 140.

For example, landmark servers 110 may include in their beacon response certain scaling factors that may be applied by client device 140. For example, landmark servers 110(3) and (4) may include the value "2" in the beacon response, indicating that client device 140 may multiply the measured latency of the beacon response by a factor of two. Landmark servers 110(1) and (2) may likewise provide values of "1" in the beacon response, indicating that client device 140 may use the actual latency values (e.g., multiply by 1) to calculate its location. In this case, the scaling factors would serve as the manipulation data determined at block 803 of method 800. Using scaling factors in this way, landmark servers 110 may respond immediately to beacon requests, while still moving client device 140 toward content server 120(1) and away from content server 120(2).

In other embodiments, landmark servers 110 may directly provide latency (and/or bandwidth) values in the beacon response. As an example, landmark servers 110 may include a numerical value indicating the client device may use the numerical value, e.g., a latency measurement in milliseconds as manipulation data to be used in place of the actual measured latency. Thus, landmark servers 110(3) and (4) may send relatively large latency values in their beacon responses, and landmark servers (1) and (2) may use relatively small values. Such implementations may also have the effect of moving client device 140 in the desired direction. Note that in embodiments where bandwidth is manipulated, smaller bandwidth values will have the effect of moving client device 140 away from a particular landmark server. Latency and/or bandwidth values that are sent to client device 140 may be scaled as discussed above when manipulating the actual measured latency and/or bandwidth.

In still further embodiments, landmark servers 110 may instead manipulate the coordinates of client device 140 directly. As an example, in a beacon response, landmark servers 110 may include a set of coordinates for client device 140 to use as its local coordinates. In some cases, the beacon response may include an override flag indicating that client device 140 should override its own latency measurements and use the coordinates included in the beacon response. The coordinates and override flag may be included in various types of communications, including as markup language or scripting code.

In still further embodiments, content server 120(2) may perform processing similar to that discussed above with respect to landmark server 110 to manipulate the coordinates for client device 140. For example, content server 120(2) may intentionally delay responses to client device 140, so that client device 140 will update its location to move away from content server 120(2). Alternatively, content server 120(2) may send the aforementioned latency scaling factors or manipulated coordinates to client device 140.

In still further embodiments, content server 120(1) may manipulate the coordinates for content server 120(2), e.g. by providing the latency factors or manipulated coordinates on behalf of content server 120(2). Generally speaking, because client device 140 may use communications with content servers 120/130 to determine its own coordinates, the techniques described above with respect to landmark servers 110 are also applicable to communications made with content servers 120/130.

Furthermore, landmark servers 110 and content servers 120/130 need not provide the manipulation data to client device 140 directly. Rather, landmark servers 110 may, for example, provide the manipulation data to content servers 120/130, such that content servers 120/130 report their own coordinates, latency values, etc. to client device 140 to implement the desired manipulation. Likewise, landmark servers 110 and content servers 120/130 may populate one or more txt records on DNS server 150 with the manipulation data. In such embodiments, client device 140 may obtain the manipulation data when resolving domain names with DNS server 150.

As discussed above, manipulating the location of devices within network system 100 may be useful to decommission one or more servers, or at other times when it may be useful to reduce the processing or network load on a server. Furthermore, load-balancing can be achieved using similar techniques as discussed above. For example, landmark servers and/or content servers 120/130 may be configured to manipulate network coordinates such that content servers experiencing lower loads are moved toward locations with high concentrations of client devices, and content servers experiencing higher loads are moved away from these areas. Alternatively, client devices may be moved toward servers with relatively low loads, and/or away from servers with relatively high loads.

Manipulation of client and/or content server coordinates is not limited to purposes of decommissioning servers or load balancing. For example, coordinates may be manipulated in various other circumstances where it is useful to redirect clients to different content servers. For example, one content server, 120(1), may include a particular version of the www.123news.com web site, such as an Adobe Flash™ version, whereas content server 120(2) may include a standard HTML version of the website. Under such circumstances, it may be desirable to redirect Adobe Flash™-enabled client devices to content server 120(1), and non-enabled client devices to content server 120(2).

As another example, content server 120(1) may have data available in a particular format, such as a database that is available in Microsoft Access™ format. Content server 120(2) may have a similar or identical database in a different format, such as MySQL. Under such circumstances, it may be desirable to redirect clients with Microsoft Access™ capabilities to content server 120(1), and clients with MySQL capabilities to content server 120(2).

Fourth Scenario

The techniques described above may be useful to direct client device 140 to an appropriate content server for obtaining access to a web service. However, the movement of client device 140 and content servers 120/130 within the network coordinate system may also provide some information about conditions on network system 100. For example, if client device 140 and content servers 120/130 are consistently moving away from landmark servers 110(2) and 110(3), this may indicate that they are experiencing some connectivity issues with landmark servers 110(2) and (3). This may be true even in situations where the relative distances between client device 140 and content servers 120/130 do not change.

For example, consider FIG. 9, which illustrates movement of client device 140 and content servers 120(2) and 130 on network system 100. The normal icons shown in FIG. 9 represent locations of each device at a first time, and the shaded icons represent new positions of the devices in response to some change in network connectivity. Note that each of these devices has a y coordinate of 30 at the first time, but subsequently each device moves 20 units in the negative y direction. Note also, however, that content server 120(1) does not move. Depending on the network performance metrics used to define the network coordinate system, this may suggest increased latency, decreased bandwidth, or both between each of content servers 120(2), 130, and client device 140, and landmark servers (2) and (3). Moreover, this may suggest that some shared network condition, such as a failed or congested router, may be used by client device 140, content server 120(2), and content server 130. Identification of the condition may be facilitated by noting that content server 120(1) does not exhibit similar movement within network system 100, as discussed in more detail below.

FIG. 10 illustrates an exemplary method 1000, for example suitable for implementation by diagnostic component 217 on landmark server 110.

Method 1000 may begin at block 1001, which involves determining first network coordinates. In the context of the present example, landmark server 110 may determine first network coordinates of one or more devices, at a first time. For example, diagnostic component 217 may determine the network coordinates of 120(1), client device 140, content server 120(2), and content server 130, e.g., (0, 30), (10, 30), (25, 30), and (30, 30), respectively.

Next, block 1002 involves determining second network coordinates. In the context of the present example, landmark server 110 may determine second network coordinates for the devices, at a second time. For example, diagnostic component 217 may determine that within a certain predetermined amount of time, e.g., one day, the network coordinates of the above-identified devices are as shown by the shaded icons of FIG. 9. For example, diagnostic component 217 may identify locations of content server 120(1), client device 140, content server 120(2), and content server 130, at (0, 30), (10, 10), (25, 10), and (30, 10), respectively.

Next, block 1003 involves calculating differences in the coordinates. In the context of the present example, landmark server 110 may calculate differences in the first and second set of coordinates for each device. Thus, diagnostic component 217 may identify that client device 140, content server 120(2), and content server 130 have each moved 20 units in the negative y direction within a day. In contrast, diagnostic component 217 may identify that content server 120(1) has not moved.

Next, block 1004 may identify a subset of devices. In the context of the present example, landmark server 110 may identify the subset of devices that have moved, e.g., for further processing. Thus, diagnostic component 217 may identify client device 140, content server 120(2), and content server 130 as the subset of devices, which excludes content server 120(1).

Next, block 1005 involves identifying a common communication route of the devices. In the context of the present example, landmark server 110 may identify a common communication route associated with the subset of devices. For example, diagnostic component 217 may determine that each of the subset of devices communicates with landmark servers 110(2) and (3) through a common router or other communication route (switch, hub, physical wire, wireless path, proxy or other server, internet service provider, etc). By identifying such a common communication route, method 1000 may assist administrators in determining where problems on network system 100 may exist. This technique may facilitate identification of overloaded connections, e.g., too much bandwidth being used on a particular connection. This technique may also facilitate identification of communication errors, e.g., re-transmits caused by communications that are not acknowledged.

In further embodiments, thresholding techniques may be used to identify the subset of devices at block 1004. For example, only devices that have moved more than a predetermined number of network units, e.g., 10, may be identified. This may be useful, because content server 120(1) may be expected to exhibit some normal movement within the network coordinate system. By setting such a threshold sufficiently high, normal movement of content server 120(1) (e.g., due to expected fluctuations in latency) may not trigger inclusion of content server 120(1) in the subset of devices at block 1004.

Furthermore, in addition or as an alternative to using the absolute value of movement, rates of movement may also be used to identify the subset of devices at block 1004. As an example, 10 units per day of movement may be designated as a threshold for inclusion in the subset. Thus, a device that moves 5 units for each of four straight days would move a total of 20 units yet would not be included in the subset. However, a device that moves 10 units in one day and does not move thereafter would be included in the subset.

In still further embodiments, certain types of devices may be excluded from method 1000. As an example, mobile devices such as laptops, cell phones, personal digital assistants (PDA's), etc. may be expected to exhibit significant movement within network system 100. In contrast, servers and/or desktops may tend to stay relatively stationary, and thus may be more useful for consideration with method 1000.

Note also that diagnostic component 217 may also be included on client device 140 and/or content servers 120/130, to implement the processing that is described above with respect to method 1000.

Method Implementations

As discussed above, FIGS. 4, 6, 8, and 10 show flowcharts of exemplary methods 400, 600, 800, and 1000, respectively. Each of these methods is consistent with at least some implementations of the present concepts. Note that the order in which methods 400, 600, 800, and 1000 are described is not intended to be construed as a limitation, and any number of the described blocks can be combined in any order to implement the method, or an alternative method.

Furthermore, while the exemplary methods are discussed with respect to the disclosed system embodiments, these methods can be implemented in any suitable hardware, software, firmware, or any combination thereof. In one case, the methods are stored on a computer-readable storage media as a set of instructions such that execution by a processor of a computing device causes the computing device to perform the method.

The invention claimed is:

1. One or more hardware computer-readable storage media comprising instructions to cause one or more hardware processors to perform acts comprising:
    storing an initial network location of a first device in a network, the network including the first device and a second device, wherein the second device provides a web service;
    monitoring one or more network performance metrics related to application communications between the first device and the web service provided by the second device; and
    determining an updated network location of the first device based on the initial network location and the one or more network performance metrics for the application communications between the first device and the web service provided by the second device.

2. The hardware computer-readable storage media according to claim 1, wherein the first device comprises a first network interface and a second network interface, the acts further comprising:
    identifying a second network location of the first device in the network, wherein the first device is concurrently at the updated network location with respect to the first network interface of the first device and the second network location with respect to the second network interface of the first device.

3. The hardware computer-readable storage media according to claim 2, the acts further comprising:
    determining a first distance of the first device from a third device when the first device uses the first network interface, wherein the third device provides another web service;
    determining a second distance of the first device from the third device when the first device uses the second network interface;
    based on the first distance and the second distance, determine that the first device is relatively closer to the third device when using the first interface than when using the second interface; and
    responsive to the determination, causing the first device to communicate with the another web service using the first network interface instead of the second network interface.

4. The hardware computer-readable storage media according to claim 3, wherein the first network interface is a wired network interface of the first device and the second network interface is a wireless network interface of the first device.

5. The hardware computer-readable storage media according to claim 1, wherein the monitoring is achieved solely utilizing the application communications.

6. The hardware computer-readable storage media according to claim 5, wherein the application communications comprise a request for one or more of:
    a web page from the web service provided by the second device,
    a current time from the web service provided by the second device, or
    autocompletion data from the web service provided by the second device.

7. The hardware computer-readable storage media according to claim 1, wherein the initial network location is represented as coordinates of a network coordinate system, the acts further comprising:
    communicating with a plurality of landmark servers having landmark server internet protocol addresses (IP) and corresponding landmark server locations represented as known coordinates in the network coordinate system,
    wherein the updated network location comprises updated coordinates for the first device that are determined based on the known coordinates of individual landmark servers.

8. The hardware computer-readable storage media according to claim 7, wherein the known coordinates of the landmark servers are independent of network performance on the network.

9. The hardware computer-readable storage media according to claim 1, wherein the one or more network performance metrics comprise transmission control protocol extended statistics (TCP ESTATS) relating to the application communications between the first device and the web service provided by the second device.

10. The hardware computer-readable storage media according to claim 1, wherein the updated network location of the first device is determined based on a second network location of the second device that provides the web service to the first device.

11. A client device comprising:
    one or more hardware processors; and
    one or more computer-readable storage media storing instructions which, when executed by the one or more hardware processors, cause the one or more hardware processors to:
        perform multiple first communications with multiple different first devices at multiple different first internet protocol (IP) addresses;
        obtain one or more first performance metrics associated with the multiple first communications performed with the multiple different first devices at the multiple different first IP addresses;
        determine a first network location of the client device based on the one or more first performance metrics;

perform one or more second communications with a second device at a second IP address that is different than each of the multiple different first IP addresses;

obtain one or more second performance metrics associated with the one or more second communications performed with the second device at the second IP address that is different than each of the multiple different first IP addresses; and update the first location of the client device based on the one or more second performance metrics to obtain an updated second location of the client device.

12. The client device of claim 11, wherein the instructions further cause the one or more hardware processors to:

obtain the one or more first performance metrics by measuring first latencies of the multiple first communications performed with the multiple different first devices at the multiple different first IP addresses.

13. The client device of claim 12, wherein the instructions further cause the one or more hardware processors to:

obtain the one or more second performance metrics by measuring one or more second latencies of the one or more second communications performed with the second device at the second IP address.

14. The client device of claim 13, wherein the multiple first communications and the one or more second communications are transmission control protocol (TCP) communications.

15. The client device of claim 11, wherein the first devices are landmark servers.

16. The client device of claim 15, wherein the second device is a content server that provides a news service or a search engine to the client device.

17. A system comprising:

a storage device configured to store a first network location of a client device in a network; and one or more hardware processors configured using computer-readable instructions to manipulate the first network location of the client device to a second network location by:

calculating an additional latency period sufficient to move the client device to the second network location, and delaying one or more communications with the client device by the additional latency period.

18. The system according to claim 17, wherein:

the first network location comprises first network coordinates of a network coordinate system, and the one or more hardware processors are further configured to manipulate the first network location by:

determining second network coordinates for the second network location, and calculating the additional latency period so that the additional latency period is sufficient to move the client device to the second network coordinates.

19. The system according to claim 17 embodied as a landmark server, wherein the one or more communications comprise beacon responses that are intentionally delayed by the landmark server to manipulate the first network location of the client device.

20. The system according to claim 17, wherein the one or more hardware processors are further configured to select the second network location to reduce a processing or network load on a first content server by moving the client device relatively closer to a second content server and further away from the first content server.

* * * * *